(12) United States Patent
Bobsein et al.

(10) Patent No.: US 7,985,795 B2
(45) Date of Patent: Jul. 26, 2011

(54) THICKENER COMPOSITION AND METHOD FOR THICKENING AQUEOUS SYSTEMS

(75) Inventors: Barrett Richard Bobsein, Sellersville, PA (US); Melissa Merlau Johnson, Ambler, PA (US); Joseph Joseph Rabasco, Allentown, PA (US); Ling Li, Blue Bell, PA (US)

(73) Assignee: Rohm and Haas Company, Philadelphia, PA (US)

( * ) Notice: Subject to any disclaimer, the term of this patent is extended or adjusted under 35 U.S.C. 154(b) by 63 days.

(21) Appl. No.: 12/586,266

(22) Filed: Sep. 18, 2009

(65) Prior Publication Data

US 2010/0076145 A1    Mar. 25, 2010

Related U.S. Application Data

(60) Provisional application No. 61/192,689, filed on Sep. 19, 2008.

(51) Int. Cl.
*C08L 53/00* (2006.01)
*C08G 18/42* (2006.01)
(52) U.S. Cl. ........................................ 524/505; 524/500
(58) Field of Classification Search ................... 524/505
See application file for complete search history.

(56) References Cited

U.S. PATENT DOCUMENTS

| 4,426,485 | A | 1/1984 | Hoy et al. |
| 5,739,378 | A | 4/1998 | Jenkins et al. |
| 2005/0150418 | A1* | 7/2005 | Bakeev et al. ............... 106/14.5 |
| 2006/0106153 | A1* | 5/2006 | Blankenship et al. ........ 524/500 |
| 2008/0234411 | A1 | 9/2008 | Bobsein et al. |

OTHER PUBLICATIONS

P. Elliott et al., "Associative Polymers in Aqueous Media. Ch.10 Behavior of Branched-Terminal, Hydrophobe-Modified, Ethoxylated Urethanes" ACS Symposioum Series 765. (2000).

* cited by examiner

*Primary Examiner* — Ling-Siu Choi
*Assistant Examiner* — Hui Chin
(74) *Attorney, Agent, or Firm* — Reid S. Willis

(57) ABSTRACT

A polymer composition with blocks of hydrophobes attached to or within the backbone of an associative thickener. The blocks are composed of two or more units of the same or different hydrophobes whereby the hydrophobe is reversibly switched between being hydrophilic and hydrophobic in nature. When the hydrophobe is rendered hydrophilic, the aqueous thickener is pourable and readily incorporated into aqueous polymer compositions. When this hydrophobe is rendered hydrophobic, the thickener performs its thickening function efficiently, especially in tinted systems. Switching is readily accomplished by adjusting the pH of the associative thickener composition and the aqueous polymer composition being thickened.

11 Claims, No Drawings

THICKENER COMPOSITION AND METHOD FOR THICKENING AQUEOUS SYSTEMS

This application claims the benefit of priority under 35 U.S.C. §119(e) of U.S. provisional patent application Ser. No. 61/192,689, filed on Sep. 19, 2008.

BACKGROUND

This invention generally relates to color compatible aqueous thickener polymer compositions, their method of manufacture and method of use.

Aqueous polymer systems, for example aqueous coatings compositions comprising emulsion polymer binders, typically use thickeners to obtain the desired degree of viscosity needed for the proper formulation and application of the aqueous system. One general type of thickener used in aqueous polymer systems is referred to in the art by the term "associative." Associative thickeners are hydrophobically modified so as to provide an aqueous system with certain characteristics such as ease of formulation, pigment settling prevention, film build during application, spatter resistance, low sag, good flow, and leveling. These associative thickeners may have hydrophobic groups attached to or within the water-soluble polymeric backbone. The polymeric backbone may be constructed from one or more blocks of polymerized oxyalkylene units, typically polyethylene oxide or polypropylene oxide. They may also utilize a cellulosic backbone.

The rheological response of associative thickeners upon color tinting is important in evaluating the quality of the thickener. This is so because associative thickeners typically exhibit a large Stormer viscosity (expressed in Krebs Units "KU") drop when colorant is added. This is especially problematic when the paint will be tinted to a deep tone because a high level of surfactant generally accompanies the colorant. There is a need in the art for thickeners that maintain desired viscosity levels in an aqueous system upon the addition of colorant.

The orientation of hydrophobic groups along the thickener backbone appears to influence the color compatibility of associative thickeners. United States Patent Application Publication No. 2005/0150418 discloses a hydrophobically modified polymer with blocks of closely clustered hydrophobic groups for use in tinted aqueous systems. Although thickeners with bunched hydrophobic groups show a particular advantage in preserving viscosity upon tinting, they have acute disadvantages. As the examples in United States Patent Application Publication No. 2005/0150418 demonstrate, aqueous solutions of known thickeners with bunched hydrophobic groups must be prepared at solids concentrations that are too low for practical commercial utility. Solutions made at higher solids concentrations are not pourable. Organic solvent can be added to provide an acceptably high solids solution at a pourable viscosity. However, organic solvent is a volatile organic compound and its use must be minimized to meet current regulatory requirements. Modified cyclodextrins have been used to suppress the as-supplied solution viscosities of associative thickeners. However, extraordinarily high levels of cyclodextrin are required with associative thickeners containing bunched hydrophobic groups, and the cost is prohibitive. Surfactants can be used to suppress as-is viscosity, but surfactant concentrations similar to the concentration of the thickener must be employed. Using such quantities of surfactants is expensive, counterproductive to thickening efficiency, and can degrade final dried coating properties.

Most of the associative thickeners presently on the market are sold as pourable aqueous liquids. For ease of use, it is desirable for the viscosity (Brookfield at 6 rpm) of such thickener products to be less than 15,000 centipoise (cps), or even less than 5,000 cps, so that the product will readily drain from its storage container, and be readily incorporated into the aqueous system to which it is added. Obtaining such pourable viscosity from thickeners incorporated at high active solids concentration requires methods that lower viscosity. A number of methods are available to perform this function, but all of these methods have significant drawbacks.

A need in the art remains, therefore, for pourable associative thickeners with both low viscosity and the highest active thickener solids possible. A need also exists for a hydrophobically-modified thickener that allows for a superior rheology upon the addition of colorant while utilizing a cost-effective, environmentally friendly method to suppress the aqueous product viscosity.

STATEMENT OF THE INVENTION

In a first embodiment, there is provided an aqueous associative thickener polymer composition comprising (a) 1% to 60% by weight of an associative thickener having a backbone comprising a polyoxyalkylene, a polysaccharide, a polyvinyl alcohol, a polyvinyl alkyl ether, or a polyvinyl pyrrolidone, said associative thickener further comprising blocks of oligomeric hydrophobes that are derived from monomers selected from the group consisting of i) alkyl or aryl moieties containing a polymerizable cyclic monomer or mixture thereof, ii) alkyl or aryl moieties containing a polymerizable ethylenically unsaturated monomer or mixture thereof, iii) derivatives of i) or ii), and iv) mixtures of i), ii) or iii), wherein said blocks of oligomeric hydrophobes are attached to or within the polymer backbone and are composed of two or more units of the same or different hydrophobes and wherein one or more of said hydrophobes comprises a secondary amine, or a tertiary amine, or a tertiary phosphine, or a combination thereof, and optionally a quaternary amine, with the proviso that less than 80% of the total amine functionality is a quaternary amine; (b) sufficient acid to substantially protonate the secondary amine, or the tertiary amine, or the tertiary phosphine, or combination thereof; (c) 40% to 99% by weight of water; and (d) 0% to 15% by weight of an organic co-solvent, surfactant, or any combination thereof, as a viscosity-suppressing additive.

For each aqueous associative thickener polymer composition of the inventions described herein, there exists a preferred embodiment for which the associative thickener has a substantially non-ionic water soluble backbone. Preferably, the associative thickener has a non-ionic water soluble backbone.

Herein, a water soluble backbone is soluble in water under acidic, neutral and basic conditions, preferably pH=3 to pH=10. Backbones which are insoluble in water under either acidic or basic conditions are not water soluble backbones. The backbone has a solubility in water at 25° C. of at least 10% by weight.

In a second embodiment, there is provided an aqueous associative thickener polymer composition comprising: (a) 1% to 60% by weight of an associative thickener comprising a substantially non-ionic water soluble backbone and blocks of oligomeric hydrophobes attached to or within the polymer backbone wherein said blocks of oligomeric hydrophobes are composed of two or more units of the same or different hydrophobes wherein one or more of said hydrophobes comprises a secondary amine, or a tertiary amine, or a tertiary phosphine, or a combination thereof, and optionally a quaternary amine, with the proviso that less than 80% of the total amine functionality is a quaternary amine; (b) sufficient acid to substantially protonate the secondary amine, or the tertiary amine, or the tertiary phosphine, or combination thereof; (c) 40% to 99% by weight of water; and (d) 0% to 15% by weight of an organic co-solvent, surfactant, cyclodextrin compound, or any combination thereof, as a viscosity-suppressing additive.

In another embodiment, the substantially non-ionic water soluble backbone comprises a polyoxyalkylene, a poly(meth) acrylamide, a polysaccharide, or a polyvinyl alcohol, or a copolymer comprising esters of (meth)acrylic acid.

In another embodiment, the blocks of oligomeric hydrophobes are derived from monomers selected from the group consisting of i) alkyl or aryl moieties containing a polymerizable cyclic monomer or mixture thereof, ii) alkyl or aryl moieties containing a polymerizable ethylenically unsaturated monomer or mixture thereof, iii) derivatives of i) or ii), and iv) mixtures of i), ii) or iii).

In another embodiment, there is provided a method to increase the viscosity of an aqueous polymer system, comprising (a) combining the aqueous polymer system with an aqueous thickener composition, wherein the aqueous thickener composition comprises: (i) 1% to 60% by weight of an associative thickener having a backbone comprising a polyoxyalkylene, a polysaccharide, a polyvinyl alcohol, a polyvinyl alkyl ether, or a polyvinyl pyrrolidone, said associative thickener further comprising blocks of oligomeric hydrophobes attached to or within the polymer backbone wherein said blocks of oligomeric hydrophobes are composed of two or more units of the same or different hydrophobes and wherein one or more of said hydrophobes comprises a secondary amine, or a tertiary amine, or a tertiary phosphine, or a combination thereof, and optionally a quaternary amine, with the proviso that less than 80% of the total amine functionality is a quaternary amine; (ii) sufficient acid to substantially protonate the secondary amine, or the tertiary amine, or the tertiary phosphine, or combination thereof, (iii) 40% to 99% by weight of water; and (iv) 0% to 15% by weight of an organic co-solvent, surfactant, cyclodextrin compound, or any combination thereof, as a viscosity-suppressing additive; and (b) adding an amount of a base sufficient to substantially deprotonate the protonated secondary amine, or protonated tertiary amine, or protonated tertiary phosphine, or combination thereof.

For each inventive method to increase the viscosity of an aqueous polymer system described herein, there exists a preferred embodiment of the method for which the associative thickener has a substantially non-ionic water soluble backbone. Preferably, the associative thickener has a non-ionic water soluble backbone.

In another embodiment, there is provided a polymer composition, comprising in admixture, (a) an aqueous polymer system; and (b) an aqueous thickener composition comprising, based on the weight of the aqueous thickener composition: (i) 1% to 60% by weight of an associative thickener having a backbone comprising a polysaccharide, a polyvinyl alcohol, a polyvinyl alkyl ether, or a polyvinyl pyrrolidone, said associative thickener further comprising blocks of oligomeric hydrophobes attached to or within the polymer backbone wherein said oligomeric blocks are composed of two or more units of the same or different hydrophobes and wherein one or more of said hydrophobes comprises a secondary amine, or a tertiary amine, or a tertiary phosphine, or a combination thereof, and optionally a quaternary amine, with the proviso that less than 80% of the total amine functionality is a quaternary amine; (ii) 40% to 99% by weight of water; and (iii) 0% to 15% by weight of an organic co-solvent, surfactant, cyclodextrin compound, or any combination thereof; wherein the secondary amine, or the tertiary amine, or the tertiary phosphine, or combination thereof, are substantially unprotonated.

In another embodiment, the associative thickener of the polymer composition has a backbone comprising a polyoxyalkylene segment greater than 10 oxyalkylene units in length and one or more segments selected from (i) a urethane segment, (ii) a urea segment, (iii) an ester segment, (iv) an ether segment, (v) an acetal segment, (vi) a ketal segment, (vii) an aminoplast segment, (viii) a segment comprising the residue of the reaction of an epihalohydrin with an alcohol, an amine, or a mercaptan, and (ix) a segment comprising the residue of the reaction of a trihaloalkane with an alcohol, an amine, or a mercaptan, and (x) combinations of the foregoing, or wherein the associative thickener is a hydrophobically modified cellulosic polymer.

DETAILED DESCRIPTION

This invention describes a composition and method whereby clustered moieties that are attached to or within the backbone of an associative thickener are reversibly switched between being hydrophilic and hydrophobic in nature. This invention is useful in a tinting composition with at least one colorant. This associative thickener has a water-soluble backbone portion and oligomeric blocks comprising two or more hydrophobic/hydrophilic units. When the units of the oligomeric block attached to or within the backbone are rendered hydrophilic, the aqueous thickener is pourable and readily incorporated into aqueous polymer compositions. When the units of the oligomeric block are rendered hydrophobic, the thickener provides good thickening, leveling, and sag properties in waterborne coatings even when used alone without other additives in the coating formulation needed in the past for tailoring the formulation for balancing these properties. Switching is readily accomplished by adjusting the pH of the associative thickener composition and the aqueous polymer composition being thickened. The compositions and methods solve a long-standing need in the art for aqueous polymer thickener compositions that are readily pourable, capable of having a high solids content, and do not adversely affect the properties of the aqueous polymer compositions being thickened or the products formed thereby. Further, when the units of the oligomeric blocks are hydrophobic, the polymer performs exceptionally well in tinted systems and, since there is no requirement for the addition of volatile organic solvents or costly additives such as cyclodextrin compounds and large quantities of surfactants, the compositions and methods are environmentally friendly and cost-effective.

For conventional associative thickeners, it is believed in the art that the thickener hydrophobic groups associate with other hydrophobic groups on other thickener molecules or on latex particle surfaces to form a dynamic three-dimensional network structure of micelles. Although the associations in this network are dynamic, interaction lifetimes can be long enough to provide viscosity to the system depending upon the applied shear rate. As disclosed in U.S. Pat. No. 4,496,708, the "micellar bridging" theory is based upon the existence within the aqueous phase of intermolecular, micelle-like associations between the hydrophobic groups bonded to the water soluble polymer. The water solubility of the hydrophobic groups determines the effective lifetime of these micelle-like associations which in turn influence thickening efficiency and viscosity. When the hydrophobic group is more soluble in water, there is a reduced driving force for micelle-like association, and thus the network lifetime is shorter and the observed viscosity is less. When the hydrophobic group is less soluble in water, there is a greater driving force for micelle-like association, and thus the network lifetime is greater and the observed viscosity is greater. In conventional systems, associative thickeners typically exhibit a large Stormer viscosity drop when colorant is added. It is believed that addition of surfactant, or colorant necessarily accompanied by surfactant, disrupts the thickener micelles and also displaces the thickener hydrophobes from the latex particles, both of which cause a drop in viscosity.

The oligomeric blocks of the present invention are attached to or within the polymer backbone and contain two or more units of the same or different hydrophobes. When these oligomeric blocks are incorporated into an associative thickener and combined with aqueous polymer systems comprising a film forming latex and a colorant, the viscosity of the aqueous system remains virtually unchanged. Thus, minimizing the drastic drop in viscosity normally observed upon the addition of colorant represents a significant improvement compared to conventional rheology modifiers.

In the polymer compositions described herein, the water solubility parameters of select hydrophobic units are modulated by controlling the pH of the thickener's aqueous environment. Many aqueous systems of commercial importance are supplied at pH values above about 8. The thickeners described herein deliver better thickening efficiency at pH values above about 8, i.e., the select hydrophobic units exist in their least water soluble form at pH values above about 8. In the aqueous thickener product as supplied at pH values less than about 6 and more than about 2.5, the thickener's efficiency is suppressed because the select hydrophobic units exist in a more water soluble form. Thus, the novel associative thickener compositions are supplied at desirably low viscosities and at practical active solids concentrations. However, the compositions thicken aqueous systems very effectively if the pH of the aqueous system is adjusted to above about 8.

Most secondary and tertiary amines, as well as some tertiary phosphines, can be protonated at aqueous pH values below about 6. Primary amines, as components of hydrophobic groups, tend to require pH values well above about 8 to deprotonate from their acid form. Thus, primary amines can generally be characterized as too basic to be useful as a component of hydrophobic groups. Nitrogen atoms that are characterized as urea or urethanes tend to not be basic enough. That is, urea and urethane functionalities tend to require a pH value below about 2.5 to exist in the protonated form. At these low pH values, the associative thickener's polyether backbone is more prone to acid catalyzed degradation. Because of degradation during storage, polyether associative thickeners with pH values below about 2.5 are less desirable. Within the range of 2.5 to 6.0, a pH of 2.5 to 5.0 or 3.0 to 4.5 can be used.

The following discussion concerning pH and $pK_a$ is applicable to secondary amines, or tertiary amines, or tertiary phosphines. The concentration of the protonated secondary or tertiary amine, that is, the conjugate acid form of the amine, is defined as [HA+]. The concentration of the unprotonated secondary or tertiary amine, that is, the base form of the amine, is defined as [A]. The concentration of protons in solution is defined as [H+]. The acidity constant of the acid form of the amine, $K_a$, can be defined as follows (see, for example, Hendrickson, Cram and Hammond, Organic Chemistry, Third Edition, McGraw-Hill, pp 301-302, (1970)).

$$K_a=[H+][A]/[HA+]$$

Furthermore, the $pK_a$ of the secondary or tertiary amine and the pH of the aqueous associative thickener composition can be defined as follows.

$$pK_a=-\log K_a$$

$$pH=-\log [H+]$$

A useful relationship is that when [HA+] equals [A], the pH of the solution will have a value equal to the $pK_a$. Therefore, at pH values less than the amine's $pK_a$, the concentration of the protonated form of the amine will exceed the concentration of the unprotonated form of the amine. The aqueous associative thickener composition must contain sufficient organic or inorganic acid to reduce the pH of the aqueous associative thickener composition below the value of the $pK_a$ of the secondary or tertiary amine functionalities which comprise the thickener's hydrophobic groups thereby substantially protonating said secondary or tertiary amines. When the aqueous associative thickener composition is added to the aqueous system to be thickened, the final pH value of the thickened system should be higher than the $pK_a$ of the secondary or tertiary amine group to substantially deprotonate the protonated hydrophobic amine groups. A method to increase the viscosity of an aqueous polymer composition comprises combining an aqueous polymer system with an aqueous associative thickener composition, wherein the backbone of said associative thickener further comprises blocks of oligomeric hydrophobes wherein said blocks are two or more units of the same or different hydrophobes, further wherein one or more of said hydrophobes comprises a secondary amine, or a tertiary amine, or a tertiary phosphine, or combination thereof, and optionally a quaternary amine, with the proviso that less than 80% of the total amine functionality is a quaternary amine, and where the aqueous associative thickener composition is provided at a pH below that of the $pK_a$ of the secondary amine, or tertiary amine, or tertiary phosphine, or combination thereof; followed by the addition of an amount of base sufficient to raise the pH of the aqueous polymer composition above the $pK_a$ of the secondary amine, or tertiary amine, or tertiary phosphine, or combination thereof, to substantially deprotonate the protonated secondary amine, or protonated tertiary amine, or protonated tertiary phosphine, or combination thereof. The hydrophobic amine or phosphine groups of the associative thickener comprising the thickened aqueous polymer composition are substantially deprotonated when the pH of the thickened aqueous polymer composition exceeds the $pK_a$ of the secondary amine, or tertiary amine, or tertiary phosphine, or combination thereof, of the associative thickener. The alternative "or" expression also encompasses the "and" combination and is used interchangeably.

The $pK_a$ value of the amine or phosphine functionalities in the hydrophobic groups can be experimentally determined by the following method. Disperse 25 gms of thickener solids homogeneously in approximately 975 gms of water and sufficient phosphoric acid to provide 1000 gms of aqueous thickener composition of 2.5% weight thickener solids at pH=4. A mechanical stirrer, a pH meter probe, and a Brookfield viscometer can be simultaneously mounted over the vessel to provide agitation, pH measurement and viscosity measurement of the aqueous composition. Temperature should be 25° C. The stirrer should be turned off while pH measurements and viscosity measurements are recorded. The pH of the aqueous composition is adjusted stepwise upwards with 10% aqueous ammonia until a maximum pH of about 10.5 is obtained. After each aliquot of ammonia is added, the composition is stirred for 5 minutes, and then pH and viscosity are measured. Viscosity in centipoise is measured at 60 rpm and spindle #3, although more viscous titrations may require 60 rpm or lesser speeds with spindle #4 to keep the viscometer readout on scale. The viscosity is plotted on a linear scale versus the pH on a linear scale. At low and high pH values, the viscosity of the aqueous composition is relatively independent of pH. At the intermediate pH values, the viscosity is more dependent upon pH. The viscosity value at the high pH end of titration curve where the viscosity starts to become relatively independent of pH is assigned as the maximum viscosity value. The point on the titration curve corresponding to half of the maximum viscosity value is defined as the midpoint of the titration. The $pK_a$ for the amine or phosphine functionalities comprising the hydrophobic groups of the associative thickener is defined as the pH value associated with the midpoint of the titration.

Aqueous associative thickeners for use in the compositions and methods described herein accordingly comprise a hydrophilic backbone comprising oligomeric blocks of hydrophobes wherein said oligomeric blocks are attached to or within the backbone and are comprised of two or more units of the same or different hydrophobes, wherein at least one of the hydrophobes comprises a secondary amine, or a tertiary amine, or a tertiary phosphine, or a combination thereof, and optionally a quaternary amine.

The hydrophilic backbone of the associative thickener can take a variety of forms, for example, the backbone can be linear, branched, crosslinked or dendritic (i.e., a configuration where three branches are attached to a single atom such as a carbon atom). A variety of different types of backbones can be used, for example a polyether such as a polyoxyalkylene, a polyacrylamide, a polymethacrylamide, a polysaccharide, a polyvinyl alcohol, a polyvinyl alkyl ether, or a polyvinyl pyrrolidone. The polyacrylamide and polymethacrylamide may collectively be referred to as poly(meth)acrylamide. In one embodiment, the hydrophilic backbone comprises a (co) polymer comprising esters of acrylic acid or esters of methacrylic acid. Again, acrylic acid and methacrylic acid may collectively be referred to as (meth)acrylic acid and the related esters may collectively be referred to as esters of (meth)acrylic acid, or as (meth)acrylates. Preferably, the backbone is non-ionic. Examples of suitable esters of (meth) acrylic acid include hydroxyethyl(meth)acrylate, that is, HEA or HEMA.

In one embodiment the backbone is a polysaccharide based on a cellulosic backbone, for example a hydroxy ethyl cellulose backbone. Thus, the associative thickener may have a backbone comprising one or more polysaccharide segments greater than 10 saccharide units in length.

In another embodiment, a polyether associative thickener is based on building blocks of polyoxyalkylene segments, for example polyethylene glycol building blocks. For example, the associative thickener may have a backbone comprising one or more polyoxyalkylene segments greater than 10 oxyalkylene units in length. As used herein, the term "oxyalkylene" refers to units having the structure —(O-A)-, wherein O-A represents the monomeric residue of the polymerization reaction product of a $C_{2-4}$ alkylene oxide. Examples of oxyalkylenes include, but are not limited to: oxyethylene with the structure —(OCH$_2$CH$_2$)—; oxypropylene with the structure —(OCH(CH$_3$)CH$_2$)—; oxytrimethylene with the structure —(OCH$_2$CH$_2$CH$_2$)—; and oxybutylene with the general structure —(OC$_4$H$_8$)—. Polymers containing these units are referred to as "polyoxyalkylenes." The polyoxyalkylene units can be homopolymeric or copolymeric. Examples of homopolymers of polyoxyalkylenes include, but are not limited to polyoxyethylene, which contains units of oxyethylene; polyoxypropylene, which contains units of oxypropylene; polyoxytrimethylene, which contains units of oxytrimethylene; and polyoxybutylene, which contains units of oxybutylene. Examples of polyoxybutylene include a homopolymer containing units of 1,2-oxybutylene, —(OCH(C$_2$H$_5$) CH$_2$)—; and polytetrahydrofuran, a homopolymer containing units of 1,4-oxybutylene, —(OCH$_2$CH$_2$CH$_2$CH$_2$)—.

Alternatively, the polyoxyalkylene segments can be copolymeric, containing two or more different oxyalkylene units. The different oxyalkylene units can be arranged randomly to form a random polyoxyalkylene; or can be arranged in blocks to form a block polyoxyalkylene. Block polyoxyalkylene polymers have two or more neighboring polymer blocks, wherein each of the neighboring polymer blocks contain different oxyalkylene units, and each polymer block contains at least two of the same oxyalkylene units. Oxyethylene is the preferred oxyalkylene segment.

In still another embodiment, polyoxyalkylene segments are linked with non-polyoxyalkylene segments or linkages. When the polyoxyalkylene units are linked with a multifunctional isocyanate, a hydrophobically modified polyurethane polyether associative thickener is generated as is known in the art. These thickeners can also contain urea linkages, ester linkages or ether linkages other than those linking the polyoxyalkylene units. The multi-functional isocyanates can be aliphatic, cycloaliphatic, or aromatic; and can be used singly or in admixture of two or more, including mixtures of isomers. Examples of suitable organic polyisocyanates include 1,4-tetramethylene diisocyanate, 1,6-hexamethylene diisocyanate, 2,2,4-trimethyl-1,6-diisocyanatohexane, 1,10-decamethylene diisocyanate, 4,4'-methylenebis(isocyanatocyclohexane), 1,4-cyclohexylene diisocyanate, 1-isocyanato-3-isocyanatomethyl-3,5,5-trimethylcyclohexane, m- and p-phenylene diisocyanate, 2,6- and 2,4-toluene diisocyanate, xylene diisocyanate, 4-chloro-1,3-phenylene diisocyanate, 4,4'-biphenylene diisocyanate, 4,4'-methylene diphenylisocyanate, 1,5-naphthylene diisocyanate, 1,5-tetrahydronaphthylene diisocyanate, hexamethylene diisocyanate trimer, hexamethylene diisocyanate biuret, and triphenylmethane-4, 4',4"-triisocyanate.

When the polyoxyalkylene segments are linked with a gem-dihalide reagent, hydrophobically modified polyacetal polyether and polyketal polyether associative thickeners are generated. Suitable gem-dihalide reagents include dihalogenomethanes, such as dibromomethane and dichloromethane; 1,1-dichlorotoluene, 1,1-dichloroethane, and 1,1-dibromomethane. When the polyoxyalkylene units are linked with an aminoplast reagent, a hydrophobically modified polyaminoplast polyether associative thickener is generated. When polyoxyalkylene units are linked with an epihalohydrin or trihaloalkane reagent, a hydrophobically modified polyEPI polyether associative thickener is generated, where EPI represents the residue of an epihalohydrin reagent's or a trihaloalkane reagent's reaction with amines, alcohols, or mercaptans. Thus, the associative thickener may have a backbone comprising one or more polyoxyalkylene segments greater than 10 oxyalkylene units in length and one or more segments selected from (i) a urethane segment, (ii) a urea segment, (iii) an ester segment, (iv) an ether segment, (v) an acetal segment, (vi) a ketal segment, (vii) an aminoplast segment, (viii) a segment comprising the residue of the reaction of an epihalohydrin with an alcohol, an amine, or a mercaptan, and (ix) a segment comprising the residue of the reaction of a trihaloalkane with an alcohol, an amine, or a mercaptan, and (x) combinations of the foregoing.

As stated above, the hydrophilic backbone comprises oligomeric blocks of hydrophobes wherein said oligomeric blocks are attached to or within the backbone and are comprised of two or more units of the same or different hydrophobes, wherein at least one of the hydrophobes comprises a secondary amine, or a tertiary amine, or a tertiary phosphine, or a combination thereof, and optionally a quaternary amine. Such groups are referred to herein as acid suppressible because the thickening efficacy of the associative thickener polymer can be effectively suppressed by protonating the amine or phosphine functionality. Thus, an acid suppressible alkyl moiety is a hydrophobic group comprising a secondary amine or a tertiary amine or a tertiary phosphine, or combinations thereof. An acid suppressible alkyl glycidyl ether is a glycidyl ether comprising an acid-suppressible alkyl moiety.

The oligomeric hydrophobic block has the chemical architecture shown below, in which some or all of the R groups comprise an acid suppressible alkyl moiety:

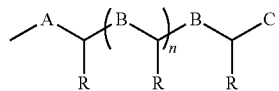

where:
n is an integer from 1-100
R comprises an alkyl or aryl group having from 2 carbons to 100 carbons. The alkyl group may be saturated or unsaturated, cyclic or non cyclic, linear or branched, or halogenated, i.e., fluorinated, chlorinated, or brominated. The alkyl and aryl groups may comprise other moieties, such as alkylsiloxane, alkylether, arylalkylether, alkylarylene ether, alkylene ether, alkyl thioether, alkylene thioether, alkyl amine, dialkyl amine, dialkyl amine oxide, trialkyl ammonium, diaryl amine, dialkyl phosphine, diaryl phosphine, dialkyl phosphine oxide, diaryl phosphine oxide, dialkyl phosphate and the like. Some or all of the R groups comprise an acid suppressible moiety.
A is a connecting diradical of —O—, —S—, —CH$_2$—, —O—CH$_2$—, —S—CH$_2$—, —NH—, —NR'—, —NH—CH$_2$—, —NR—CH$_2$—, —PR'—, —POR'— (where R'=1 to 12 carbons), polyalkylene ether (Mw=44 to 50,000), polyalkylene isocyanate-HEUR (Mw=100 to 80,000).
B is a connecting group of: —CH$_2$—, —CH$_2$O—, —CH$_2$S—, —CH$_2$—NH—, —CRH—O—, —CR"H—S—, —CR"H—NH—, and —CH$_2$NR"— (where R"=1-12 carbons).
C is a connecting end as described for A, or a terminating end equal to: —OH, SH, —NHR''', —OR''', —SR''', and —H.

As stated above, the oligomeric blocks of hydrophobes are attached to or within the thickener backbone and are located terminally or along the length of the thickener backbone. These oligomeric blocks of hydrophobes are selected from the group consisting of i) alkyl or aryl moieties containing a polymerizable cyclic monomer or mixture thereof, ii) a polymerizable alkene or mixture thereof, iii) derivatives of i) or ii), and iv) mixtures of i), ii) or iii), and are comprised of two or more units of the same or different hydrophobes. These oligomeric blocks could be synthesized from corresponding alkyl glycidyl ether (or thio or amido) by heating with a base or a proper nucleophile of choice. In a preferred embodiment, the oligomeric blocks are synthesized from N,N-dialkyl(oxiranylmethyl)amine by heating with a base or a proper nucleophile of choice. Control oligomerization like atom transfer polymerization, living radical polymerization, cationic polymerization, anionic polymerization and group transfer polymerization with proper quenching reagent would yield desired hydrophobic units from reactive alkene monomers such as styrene, vinyl ether, vinyl ester, acrylate esters, acrylamide ester.

The oligomeric blocks may be connected to the thickener backbone via an ether, ester, urethane, amide, amine, imide, or urea functionality, depending on the choice of one who is skilled in the art. The connection could be done via a diepoxide, a diisocyanate, a dialkyl halide, diester, or a compound bearing a mix of reactive groups (for example, epoxyalkylhalide, alkylhalide isocyanate).

The commonly practiced procedure to attach a hydrophobic group to a thickener backbone bearing reactable hydroxyl groups, such as cellulose derivatives, is by heating the cellulose alkaline derivative with a hydrophobic group containing a halide or epoxide. Either an alkyl halide or an alkyl glycidyl ether can be used to modify a hydrophobic group. Therefore, it is possible to convert a hydrophobic group to an epoxide (using epihalohydrin), or an halogenating reagent like PBr$_3$ or PCl$_5$ to form a reactive hydrophobic group. In a preferred embodiment, a dialkylamine is converted to an epoxide with epichlorohydrin in order to synthesize a N,N-dialkyl(oxiranylmethyl)amine, which is then attached to the thickener backbone.

It is also convenient to make a telechelic polyurethane of hydrophobically modified ethylene oxide urethane block copolymer (HEUR) using a pre-made oligomeric hydrophobic group. For example, an oligomeric hydrophobic group containing one hydroxyl or two hydroxyl groups may be added to a mixture of polyethylene oxide with a reactive hydroxyl end group and then allowed to react with a diisocyanate. It is, however, most convenient to make the HEUR backbone and react it with an acid suppressible alkyl glycidyl ether or an N,N-dialkyl(oxiranylmethyl)amine of choice. The moiety on the alkyl glycidyl ether and the N,N-dialkyl(oxiranylmethyl)amine oligomerizes at the end of the HEUR backbone to give the telechelic HEUR.

It is also convenient to heat a mixture of polyethylene glycol and an acid suppressible alkyl glycidyl ether in the presence of base in order to make hydrophobically modified PEG.

As stated above, at least one of the oligomeric hydrophobic blocks attached to or within the thickener backbone contains a secondary amine, or a tertiary amine, or a tertiary phosphine, or a combination thereof, and optionally a quaternary amine, that modulates the water solubility of the hydrophobic unit, depending on the pH of the aqueous composition containing the thickener.

Herein, a secondary amine is defined as a nitrogen with bonds to only one hydrogen and two carbons, wherein neither of the two adjoining carbons are classified as carbonyls or thionyls. Carbonyls are carbons with a double bond to oxygen. Thus, nitrogen that can be classified as part of amide, urethane or urea groups are not secondary amines. Thionyls are carbons with a double bond to sulfur. The two carbons adjoining the nitrogen radical may have other atoms or groups of atoms, including hydrogen and carbon, bonded to them, with the proviso that at least one of the groups of atoms includes a covalent bond to the thickener backbone. The groups of atoms bonded to the two carbons adjoining the nitrogen radical may connect forming a heterocyclic nitrogen moiety. Optionally, the amine group may be oxidized to the corresponding amine oxide.

Herein, a tertiary amine is defined as a nitrogen with bonds to only two or three carbons wherein the adjoining carbon atoms are not classified as carbonyls or thionyls. Thus, nitrogen that can be classified as part of an amide, urethane or urea group is not a tertiary amine. The two or three carbons adjoining the nitrogen may have other atoms or groups of atoms, including hydrogen and carbon, bonded to them, with the proviso that at least one of the groups of atoms includes a covalent bond to the thickener backbone. The groups of atoms bonded to the two or three carbons adjoining the nitrogen may connect forming a heterocyclic nitrogen moiety. Optionally, the amine group may be oxidized to the corresponding amine oxide.

A quaternary amine is defined as a nitrogen with bonds to four carbons.

Herein a tertiary phosphine is defined as any of several organic compounds having the structure of a tertiary amine as described above, but with phosphorus in place of nitrogen.

The associative mechanism requires a plurality of (i.e., two or more) hydrophobic groups on each hydrophilic backbone to participate in the network structure responsible for viscosity generation. It has been found that the presence of only a single secondary amine, or tertiary amine, or tertiary phosphine, in the associative thickener is sufficient to decrease the thickening efficiency of the thickener at low pH. However, in one embodiment, at least 2, in another embodiment at least 3, and yet another embodiment at least 5 of the hydrophobic groups which comprise secondary amines, or tertiary amines, or tertiary phosphines are present per thickener molecule.

By "attached to or within the backbone" of the thickener, we mean these blocks of oligomeric hydrophobes may be located within the backbone, pendant to the backbone and/or on chain termini. The term "blocks of oligomeric hydrophobes," "oligomeric blocks," and "blocks" refer to alkyl and aryl moieties derived from a polymerizable cyclic monomer, a polymerizable ethylenically unsaturated monomer, or derivatives of both these moieties, wherein the blocks are two or more units of the same or different hydrophobes. The term "hydrophobic unit" and "oligomeric unit" refer to hydrophobic groups or hydrophobes within oligomeric blocks. The term "hydrophobic group" and "hydrophobe" means a group chosen from radicals and polymeric groups comprising at least one hydrocarbon-based chain chosen from linear and branched, saturated and unsaturated hydrocarbon-based chains, which optionally comprise one or more hetero atom, such as P, O, N and S, and radicals comprising at least one chain chosen from perfluoro and silicone chains. When the term "hydrophobic group" means a group chosen from the hydrocarbon radicals, the hydrophobic group comprises at least 6 carbon atoms, preferably 10-24 carbon atoms. When a hydrophobic unit is an alkyl moiety derived from a polymerizable cyclic monomer, the alkyl group can have 1 to 40 carbon atoms, preferably 3 to 24 carbons, and more preferably 6 to 18 carbons. When a hydrophobic unit is an aryl moiety derived from a polymerizable cyclic monomer, the aryl group can have 6 to 40 carbon atoms, preferably 6 to 29 carbons, and more preferably 7 to 15 carbons. Examples of acid suppressible polymerizable cyclic monomers include, but are not limited to, N,N-dialkyl(oxiranylmethyl)amine, N,N-diaryl(oxiranylmethyl)amine, and N, N-arylalkyl(oxiranylmethyl)amine.

In the aqueous thickener composition, at least 10%, preferably at least 25%, more preferably at least 50%, and even more preferably at least 80% of the hydrophobic groups have one or more of a secondary amine or a tertiary amine, or a tertiary phosphine functionality.

Examples of reagents that can be used to generate hydrophobic groups comprising at least one tertiary amine functionality include 2-(dibutylamino)ethanol, 2-(dioctylamino)ethanol, 2-(diheptylamino)ethanol, 2-(dihexylamino)ethanol, 2-(diethylhexylamino)ethanol, 2-(dicocoamino)ethanol, 3-dibutylamino propylamine, N-benzyl, N-methyl ethanolamine, 1-(dibutylamino)-2-butanol, 2-amino-5-diethylaminopentane, 1-(bis(3-(dimethylamino)propyl)amino)-2-propanol, N-benzyl 3-hydroxypiperidine, diphenylmethyl piperazine, 1-(1-alkylpiperazine), 1-(1-arylpiperazine), 1-(2-Aminoethyl)-4-benzyl-piperazine, 4-amino-1-benzyl-piperidine, 6-dipropylamino-1-hexanol, 1-dodecylisonipecotamide. Alkoxylated analogs of the di-alkylamino ethanol compounds are also suitable reagents. For example, 2-(dihexylamino)ethanol ethoxylated with 1 to 100 units of ethylene oxide are suitable reagents. The above compounds can be used to create oligomeric blocks, for example, by first converting them to the glycidyl ether derivative via the reaction with epichlorohydrin, followed by subsequent ring opening oligomerization.

In one particularly preferred embodiment, the associative thickener has a backbone comprising one or more polyoxyalkylene segments greater than 10 oxyalkylene units in length and is a hydrophobically modified polyurethane polyether comprising the reaction product of a N,N-dialkyl(oxiranylmethyl)amine with a multi-functional isocyanate, a polyether diol, and optionally a polyether triol. Preferably, the polyether diol has a weight average molecular weight between 2,000 and 12,000, preferably between 6,000 and 10,000.

Thus, a preferred method to increase the viscosity of an aqueous polymer system comprises: (a) combining the aqueous polymer system with an aqueous thickener composition, wherein the aqueous thickener composition comprises: (i) 1% to 60% by weight of an associative thickener having a backbone comprising one or more polyoxyalkylene segments greater than 10 oxyalkylene units in length, said associative thickener further comprising blocks of oligomeric hydrophobes that are selected from the group consisting of i) alkyl or aryl moieties containing a polymerizable cyclic monomer or mixture thereof, ii) a polymerizable alkene or mixture thereof, iii) derivatives of i) or ii), and iv) mixtures of i), ii) or iii), wherein said oligomeric blocks are attached to or within the polymer backbone and are composed of two or more units of the same or different hydrophobes and one or more of said hydrophobes comprises a secondary amine, or a tertiary amine, or a tertiary phosphine, or a combination thereof, and optionally a quaternary amine, with the proviso that less than 80% of the total amine functionality is a quaternary amine, wherein the associative thickener is a hydrophobically modified polyurethane polyether comprising the reaction product of a N,N-dialkyl(oxiranylmethyl)amine with a multi-functional isocyanate, a polyether diol having a weight average molecular weight between 2,000 and 12,000, preferably between 6,000 and 10,000, and optionally a polyether triol; (ii) sufficient acid to substantially protonate the secondary amine, or the tertiary amine, or the tertiary phosphine, or combination thereof; (iii) 40% to 99% by weight of water; and (iv) 0% to 15% by weight of an organic co-solvent, surfactant, cyclodextrin compound, or any combination thereof, as a viscosity-suppressing additive; and (b) adding an amount of a base sufficient to substantially deprotonate the protonated secondary amine, or protonated tertiary amine, or protonated tertiary phosphine, or combination thereof.

Examples of reagents that can be used to generate hydrophobic groups comprising at least one tertiary amine functionality, where the nitrogen has bonds to two carbons only, include pyridine derivatives, such as alkyl- or aryl-substituted hydroxypyridine derivatives, alkyl- or aryl-substituted aminopyridine derivatives, quinoline derivatives, such as hydroxyquinoline, aminoquinoline, 8-ethyl-4-quinolinol, and 6-amino-1,10-phenanthroline, pyrazole and pyrazoline derivatives, such as, 3-amino-5-phenylpyrazole and 5-aminoindazole, imidazole derivatives, such as 2-benzimidazole methanol, 2-butyl-4-hydroxymethylimidazole, and 2-mercapto-1-hexylimidazole, oxazole derivatives, such as, oxazol-2-yl-phenylmethanol, 2-amino-5-ethyl-4-phenyloxazole, 4-(5-methyl-1,3-benzoxazol-2-yl)phenylamine, and imine derivatives, such as alpha-(2-butylimino)-p-cresol, N-(benzylidene)ethanolamine, and 1-((2-hydroxyethyl)iminomethyl)naphthalene. Additional examples of suitable reagents are the corresponding amine oxides of any of the above compounds. The above compounds can be used to create oligomeric blocks, for example, by first converting them to the glycidyl ether derivative via the reaction with epichlorohydrin, followed by subsequent ring opening oligomerization.

Examples of reagents that can be used to generate hydrophobic groups comprising at least one tertiary phosphine functionality include dialkylhydroxymethylphosphines and dialkylhydroxyethyl-phosphines. Other examples of reagents that can be used to generate hydrophobic groups comprising at least one tertiary phosphine functionality include dialkylphosphines, such as dihexylphosphine, dioctylphosphine, dibenzylphosphine, diphenylphosphine, bis-(dodecyl)phosphine, and the like. The above compounds can be used to create oligomeric blocks, for example, by first converting them to the glycidyl ether derivative via the reaction with epichlorohydrin, followed by subsequent ring opening oligomerization.

Not all of the hydrophobic groups in the associative thickener are required to comprise secondary amines or tertiary amines or tertiary phosphines. Examples of reagents that can be used to form the hydrophobic groups not comprising secondary amines or tertiary amines or tertiary phosphines include branched or linear aliphatic alcohols, alkylaryl alcohols, aliphatic amines, p-alkylene glycol mono-alkyl ethers, alkyl glycidyl ethers and aryl glycidal ethers. Reagents may be mono-functional or multi-functional. Examples of suitable branched aliphatic alcohols include 2-butyl 1-octanol, 2-butyl 1-decanol, 2-hexyl 1-octanol, 2-hexyl 1-decanol, isononyl alcohol, isodecyl alcohol, and isoundecyl alcohol. Examples of suitable linear aliphatic alcohols include 1-hexadecanol, 1-tetradecanol, 1-dodecanol, 1-undecanol, 1-decanol, 1-nonanol, 1-octanol, 1-hexanol, 1,2-hexadecanediol, and 1,16-hexadecanediol. Examples of suitable alkyl aryl alcohols include nonyl phenol and tri-styryl phenol. Examples of suitable aliphatic amines include 1-decyl amine, 1-octyl amine, 1-hexyl amine, di-octyl amine, di-hexyl amine. Examples of suitable p-alkylene glycol mono-alkyl ethers include alkyl ethoxylates where the alkyl group ranges from 1 carbon to 24 carbons. All of the reagents listed in the above paragraph may be used to form hydrophobic groups that are not in the oligomeric blocks.

Organic or inorganic acids can be used for protonating the amine functionality in the associative thickener. Suitable acids include, for example, phosphoric acid, acetic acid, hydrochloric acid, sulfuric acid, lactic acid, glutaric acid, citric acid, carbonic acid, ascorbic acid, glycolic acid, isoscorbic acid, adipic acid, succinic acid, oxalic acid, homopolymers and copolymers of acrylic acid, homopolymers and copolymers of methacrylic acid, homopolymers and copolymers of maleic anhydride, homopolymers and copolymers of styrenesulfonate, homopolymers and copolymers of 2-acrylamido-2-methylpropane sulfonic acid, polyphosphoric acid, homopolymers and copolymers of phosphoethylmethacrylate, alpha hydroxy acids and trans-cinnamic acid. Lactic acid, phosphoric acid or polyacrylic acid with a molecular weight between 1000 and 5000 are preferred.

The thickener and acid are combined to provide an aqueous thickener composition. As used herein, the term "aqueous thickener composition" (or "aqueous thickener polymer composition" or "aqueous associative thickener composition") refers to a composition that is provided predominantly in water rather than organic solvent, although a minor amount of a water-miscible organic solvent can be present. Preferably the aqueous thickener composition comprises less than 5 weight % water miscible solvent, more preferably less than 2 weight % water miscible solvent, and most preferably, less than 1 weight % water miscible solvent, based on the weight of the aqueous thickener composition. In one embodiment, no organic solvent is present in the aqueous thickener composition.

In one embodiment, the aqueous thickener composition further comprises additives useful to decrease the viscosity of the composition. This is especially useful where the amine or phosphine functionalities are not completely protonated, that is, where it is desired to adjust the pH of the composition to be in the higher end of the pH range of 2.5 to 6. Suitable viscosity suppressing additives include, for example, surfactants such as dialkylsulfosuccinates, sodium lauryl sulfate, alkyl ethoxylates and alkylarylethoxylates; cyclodextrin compounds such as cyclodextrin (which includes α-cyclodextrin, β-cyclodextrin, and γ-cyclodextrin), cyclodextrin derivatives, cycloinulohexose, cycloinuloheptose, cycloinulo-octose, calyxarene, and cavitand. "Cyclodextrin derivatives" refer to α-cyclodextrins, β-cyclodextrins, and γ-cyclodextrins in which at least one hydroxyl group located on the rim of the cyclodextrin ring has been functionalized with a substituent group such as methyl, acetyl, hydroxypropyl, hydroxyethyl group. Cyclodextrin derivatives also include cyclodextrin molecules with multiple substituent groups including cyclodextrin molecules with more than one type of substituent group. Cyclodextrin derivatives do not include polymers with more than one attached cyclodextrin ring. Preferred cyclodextrin derivatives are methyl-β-cyclodextrin and hydroxypropyl-β-cyclodextrin, in particular methyl-β-cyclodextrin. Since surfactants degrade the effectiveness of the cyclodextrin compound in reducing viscosity, it is preferred that surfactants not be employed when a cyclodextrin compound is added to the aqueous thickener polymer composition.

In another embodiment for the preparation of the aqueous thickener composition, the associative thickener of the types described above is first dissolved or dispersed in water with no added acid; sufficient acid is then added such that the amount of acid is sufficient to adjust the pH of the aqueous thickener composition to a pH of 2.5 to 6. In yet another embodiment, the acid or some portion of the total acid is first pre-mixed with water, then the associative thickener polymer is subsequently dissolved or dispersed with stirring or agitation into the acid and water mixture, and if necessary, additional acid is added. Other additives, e.g., water miscible organic solvents or cyclodextrin compounds can be incorporated into the compositions at any point.

In an advantageous feature, the aqueous associative thickener compositions may be pourable at 25° C. The composition can have a viscosity of 500 cps to 15,000 cps, specifically less than 10,000 cps, even more specifically less than 5,000 cps. In a specific embodiment, the compositions are pourable without addition of any organic solvent and/or other viscosity-reducing additive, e.g., large quantities of surfactant or cyclodextrin compound.

In still another advantageous feature, the aqueous associative thickener compositions can be formulated to contain a wide range of solids content. For example, the aqueous associative thickener composition can comprise 1 weight % to 60 weight % thickener solids, specifically 5 weight % to 40 weight % thickener solids, even more specifically 15 weight % to 25 weight % thickener solids, based on the total weight of the aqueous associative thickener compositions. The compositions further comprise 40 weight % to 99 weight % aqueous solution, specifically 60 weight % to 95 weight % aqueous solution, even more specifically 75 weight % to 85 weight % aqueous solution, based on the total weight of the aqueous associative thickener compositions. As stated above, the "aqueous solution" can comprise up to 5 weight percent of a water-miscible organic solvent. The optional additives used to further decrease the viscosity of the composition can be present in an amount of 0 weight % to 15 weight %, specifically 1 weight % to 10 weight %, even more specifically 1 weight % to 3 weight %, based on the total weight of the aqueous associative thickener compositions.

Mixing techniques to incorporate the aqueous associative thickener in the aqueous composition to be thickened include conventional mixing equipment such as mechanical lab stirrers, high speed dispersers, ball mills, sand mills, pebble mills, and paddle mixers. The aqueous associative thickener composition can be incorporated into aqueous polymer compositions in amounts from 0.005 weight % to 20 weight %, preferably from 0.01 weight % to 10 weight %, and most preferably from 0.05 weight % to 5 weight %, based on the weight of the aqueous composition.

Typical aqueous polymer systems in which the aqueous associative thickener compositions are added include paints, such as latex paints; dispersed pigment grinds; coatings, including decorative and protective coatings; wood stains; cosmetics, personal care items such as, for example, shampoos, hair conditioners, hand lotions, hand creams, astringents, depilatories, and antiperspirants; adhesives; sealants; inks; cementitious coatings; joint compounds and other construction materials; drilling fluids; topical pharmaceuticals; cleaners; fabric softeners; pesticidal and agricultural compositions; paper or paperboard coating formulations; textile formulations; and non-woven formulations.

In one embodiment, the aqueous polymer system to be thickened is a latex composition. A latex composition contains discrete polymer particles dispersed in an aqueous medium. Examples of such latex compositions include latex emulsion polymers, including but not limited to polymers that comprise (meth)acrylates, styrene, vinyl acetate or other ethylenically unsaturated monomers; latex paints; pre-blend formulations for paints or coatings; textile formulations; non-woven formulations; leather coatings; paper or paperboard coating formulations; and adhesives.

In a preferred embodiment, the latex-paint composition has a pigment volume concentration (PVC) of from 0% to 80%. PVC is a measure of how "binder-rich" a formulation is. It is calculated as follows:

$$PVC = 100\% \times \frac{(\text{volume of pigment}(s) + \text{volume of extenders}(s))}{(\text{volume of pigments}(s) + \text{volume of extender}(s) + \text{volume of binder}(s))}$$

In a preferred embodiment, the latex paint composition is a base paint to which colorants or pigments are added at the point of sale to the consumer. Thus, a tinted or colored paint is provided. A colorant or colorant composition is added to another composition, for example a base paint, to impart color. Colorants may include one or more inorganic or organic pigments, or metal effect agents, or combinations thereof. Examples of suitable pigments include titanium dioxide white, carbon black, lamp black, black iron oxide, red iron oxide, yellow iron oxide, brown iron oxide (a blend of red and yellow oxide with black), phthalocyanine green, phthalocyanine blue, organic red pigment (such as naphthol red, quinacridone red and toluidine red), quinacridone magenta, quinacridone violet, DNA orange, and organic yellow pigment (such as Hansa yellow) and combinations thereof. An example of a metal effect agent includes mica having a titanium dioxide layer. For architectural paints, the most commonly used pigment is titanium dioxide.

The colorant composition usually includes surfactants and optionally dispersants to aid in the dispersion and the stabilization of the pigments or the metal effect agents in the liquid medium of the colorant composition. The liquid medium may contain water, glycols such as ethylene glycol and propylene glycol, and alcohols such as isopropanol. Other materials commonly included in colorant compositions are dispersing resins; polyethylene oxide polymers; polyethylene oxide glycols; extenders such as talc and calcium carbonate; humectants; thickeners; defoamer; and biocides.

A tinted paint may contain more than one colorant. For example, a paint having a brown hue may be prepared by combining a red colorant and a yellow colorant.

The invention is not limited by the type of colorant added and is useful for any colorant that contains surfactant or other additives that may interfere with the non-specific associations of associative thickeners.

In still another embodiment, the aqueous associative thickener polymer composition may be supplied at the lower pH, such that the amine or phosphine groups are protonated as described above, together with a latex emulsion polymer or other aqueous polymer system. The pH may be raised in a further formulating step, which may include, for example, the addition of an amount of base sufficient to substantially deprotonate the protonated amine or phosphine groups of the aqueous associative thickener polymer, and thereby effect an increase in viscosity. Thus, advantageously, a latex emulsion polymer is supplied together with the latent thickener, which is later formulated into an aqueous paint composition providing the desired increase in viscosity during formulation of the paint.

Optionally, the aqueous polymer compositions may comprise other components, such as fillers, and extenders such as, for example, clays, mica, talc, and silica; surfactants; salts; buffers; pH adjustment agents such as bases and acids; biocides; mildewcides; wetting agents; defoamers; dispersants; pigments; dyes; water miscible organic solvents; anti-freeze agents; corrosion inhibitors; adhesion promoters; waxes; crosslinking agents; and other formulation additives known in the art.

EXAMPLES

The following abbreviations are used in the examples:

| | |
|---|---|
| HMDI | 4,4'-Methylene bis(cyclohexyl isocyanate) |
| IPDI | Isophorone diisocyanate |
| PEG | polyethylene glycol |
| HEUR | Hydrophobically modified ethylene oxide urethane polymer |
| SEC | size exclusion chromatography |
| HPLC | high pressure liquid chromatography |
| Mw | weight average molecular weight |

The weight average molecular weights (Mw) of the associative thickeners were determined using size exclusion chromatography (SEC). The separations were carried out at room temperature on a liquid chromatograph consisting of an Agilent 1100 Model isocratic pump and autoinjector (Waldbronn, Germany), and a Polymer Laboratories ELS-1000 Model evaporative light scattering detector (Polymer Laboratories, International, Ltd., Church Stretton, UK). The detector was operated with a 140° C. nebulizer, a 180° C. evaporator, and a 1.5 liter²/minute gas flow rate. System control, data acquisition, and data processing were performed using version 3.0 of Cirrus® software (Polymer Laboratories, Church Stretton, UK). Samples were prepared in N,N-dimethylacetamide (DMAc, HPLC grade) at concentrations of 2 milligram/milliliter (mg/ml), shaken for 6 hours at 80° C., and filtered using 0.45 micron polytetrafluoroethylene (PTFE) filter. The SEC separations were performed in DMAc (HPLC grade) at 0.5 milliliter/minute (ml/min) using a SEC column set comprised of three PLgel™ columns (300×7.5 mm ID) packed with polystyrene-divinylbenzene gel (pore size marked as 100 Å, $10^3$ Å and $10^4$ Å, particle size 5 microns) purchased from Polymer Laboratories (Church Stretton, UK). The injection volume was 100 microliters (ul) of sample solution at a concentration of 2 mg/ml. The molar mass characteristics of the analyzed samples were calculated based on polyethylene glycol/oxide (PEG/PEO) standards also purchased from Polymer Laboratories (Church Stretton, UK).

The following examples are presented to illustrate the synthesis and the composition of the invention. The Comparative Examples demonstrate the properties obtained for associative thickener polymers comprising hydrophobes with amine groups, but wherein the hydrophobes are not present as oligomeric blocks of hydrophobes. These examples are intended to aid those skilled in the art in understanding the present invention. The present invention is, however, in no way limited thereby.

Comparative Example A

Polymer Comprising Hydrophobes with Amine Groups

A mixture of 35.0 g PEG (molecular weight 8000) and 60.0 g toluene was dried by azeotropic distillation. The mixture was cooled to 90° C., and 1.5 g HMDI and 0.1 g dibutyltin dilaurate were added. After 1 hour at 90° C. with stirring, 1.0 g di-n-octylaminoethanol was added. The mixture was then held at 90° C. with stirring for another hour. The resulting solid polymer was isolated after precipitation with hexanes. Mw was measured as 41,000.

Comparative Example B

Polymer Comprising Hydrophobes with Amine Groups

A mixture of 50.0 g PEG (molecular weight 8000) and 100.0 g toluene was dried by azeotropic distillation. The mixture was cooled to 90° C., and 5.0 g HMDI and 0.1 g dibutyltin dilaurate were added. After 1 hour at 90° C. with stirring, 6.2 g of di-hexylaminoethanol was added. The mixture was then held at 90° C. with stirring for another hour. The resulting solid polymer was isolated after precipitation with hexanes. Mw was measured as 36,000.

Comparative Example C

Polymer Comprising Hydrophobes with Amine Groups

A mixture of 50.0 g PEG (molecular weight 8000) and 100.0 g toluene was dried by azeotropic distillation. The mixture was cooled to 90° C., and 2.2 g HMDI and 0.1 g dibutyltin dilaurate were added. After 1 hour at 90° C. with stirring, 1.4 g of di-(2-ethylhexyl)aminoethanol was added. The mixture was then held at 90° C. with stirring for another hour. The resulting solid polymer was isolated after precipitation with hexanes. Mw was measured as 47,000.

Aqueous Composition of Comparative Thickener Polymers

Dispersions of thickener in water were produced by weighing solid dry polymer and water into 50 milliliter (mL) plastic centrifuge tubes. In some cases, glacial acetic acid was also added. The tubes were capped and mounted on a rotator for continuous tumbling over 48 hours. For each example, the highest pH sample was obtained by adding only water and solid dry polymer to the centrifuge tube. The pH value in the samples with added acetic acid varies depending upon how much acetic acid was added. Once homogeneous, the samples were equilibrated in a 25° C. water bath just prior to measuring pH and viscosity on a Brookfield DV-II+LV viscometer. Aqueous sample pH values were measured on a Corning pH Meter Model 430 (Corning Incorporated, Corning, N.Y., USA). The pH meter was calibrated with pH=7.0 and pH=4.0 buffer solutions from Fisher Scientific (Fair Lawn, N.J., USA).

In the following examples, the objective is to provide the thickener solution at low viscosity so that formulators can add it easily while maintaining a practical active solids concentration. That is, without excessive dilution.

Aqueous Composition of Comparative A: Di(Octylamino)-Ethanol Capped HEUR

The hydrophobic groups in this hydrophobically modified polyurethane polyether associative thickener comprise a tertiary amine functionality. The diisocyanate linker's reaction with the hydroxyl functionality on the 2-(dioctylamino)-ethanol results in a urethane residue. This thickener is an example of single hydrophobic groups comprising tertiary or secondary amine functionality being located at the ends of backbone chains. There are no oligomeric blocks of hydrophobes created by the reaction of polymerizable cyclic monomers in this comparative example. The tertiary amine functionality is protonated as solution pH is reduced with added acid, in this case acetic acid. As shown in Table 1, aqueous thickener solution viscosity is suppressed at lower pH values. The aqueous thickener solution viscosities of thickeners comprising hydrophobe blocks is expected to exhibit a similar advantageous pH dependency.

TABLE 1 pH Dependence of Viscosity for Thickener Comparative A

| Aqueous Thickener | % Thickener Solids | pH | Viscosity (#4, 60 rpm), cps |
| --- | --- | --- | --- |
| Comparative A | 5.0 | 6.22 | 10,400 |
| Comparative A | 5.0 | 5.26 | 300 |
| Comparative A | 5.0 | 4.28 | 13 (#4, 100 rpm) |

Aqueous Composition of Comparative C: Di-(2-Ethylhexyl) Amino-Ethanol Capped HEUR The hydrophobic groups in this hydrophobically modified polyurethane polyether associative thickener comprise a tertiary amine functionality. The diisocyanate linker's reaction with the hydroxyl functionality on the di-(2-ethylhexyl) amino-ethanol results in a urethane residue. This thickener is an example of single hydrophobic groups comprising tertiary or secondary amine functionality being located at the ends of backbone chains. There are no oligomeric blocks of hydrophobes created by the reaction of polymerizable cyclic monomers in this comparative example. Comparative Example C wax (8 gms), 0.2 gms of glacial acetic acid and 31.8 gms water are mixed for 24 hours to provide an aqueous thickener solution. As shown in Table 2, aqueous thickener solution viscosity is suppressed at lower pH values. When the 20% thickener solution is made with no acetic acid, the result is a gelatinous, semi-solid material.

TABLE 2 pH Dependence of Viscosity for Thickener Comparative C

| Aqueous Thickener | % Thickener Solids | pH | Viscosity (#4, 60 rpm), cps |
|---|---|---|---|
| Comparative C | 20 | 3.9 | 3800 |

Example of Viscosity Versus pH Titration to Determine $pK_a$: Comparative B 25 gms of the thickener in Comparative Example B was dissolved in water, with sufficient phosphoric acid addition, to generate a 2.5% weight thickener solids solution at pH=4. Brookfield viscosity (#3 spindle, 60 rpm) was less than 8 cps. Concentrated ammonia was added in stepwise additions and pH and viscosity were measured following 5 minutes stirring. The data are recorded in Table 3. The maximum viscosity value is 172 cps. Therefore, the pKa determined for the thickener in Comparative Example B is 8.7.

TABLE 3 pH Dependence of Viscosity for Thickener Comparative B
Viscosity of Thickener Comparative Example B (2.5 weight %)

| pH | Viscosity (cps) |
|---|---|
| 4.0 | 7 |
| 5.0 | 6 |
| 6.0 | 7 |
| 7.0 | 7 |
| 7.43 | 8 |
| 7.65 | 12 |
| 7.85 | 12 |
| 8.07 | 20 |
| 8.21 | 28 |
| 8.38 | 44 |
| 8.53 | 58 |
| 8.69 | 78 |
| 8.81 | 96 |
| 8.90 | 110 |
| 9.00 | 132 |
| 9.18 | 150 |
| 9.28 | 166 |
| 9.38 | 170 |
| 9.48 | 172 |

It is expected that aqueous compositions containing associative thickeners comprising oligomeric blocks containing secondary amines, tertiary amines or phosphines will demonstrate a pH dependent viscosity similar to the Comparative Examples. That is, the viscosities of such aqueous compositions will be low at pH values below the pKa and will be high at pH values above the pKa of the protonated secondary or tertiary amine or phosphine.

Thickener Performance in Paints: Comparative Thickeners

The performance obtained by the use of associative thickeners comprising hydrophobic groups that comprise partially or wholly protonated secondary or tertiary amine functionality is demonstrated in a latex paint composition. A latex paint composition, Pre-paint #1, was prepared by combining the following components:

| | |
|---|---|
| Kronos 4311 titanium dioxide slurry | 262.8 g |
| Water | 150.1 g |
| Ethylene glycol | 24.3 g |
| Ropaque Ultra plastic pigment | 49.7 g |
| Rhoplex SG-30 binder | 420.9 g |
| Drewplus L-475 defoamer | 4.0 g |
| Texanol coalescent | 19.2 g |
| Triton X-405 surfactant | 2.5 g |
| Acrysol RM-2020NPR co-thickener | 30.0 g |
| Total | 963.5 g |

Kronos 4311 is a product of Kronos Incorporated (Chelmsford, MA, USA).
Acrysol ™ RM-2020NPR, Ropaque ™ Ultra and Rhoplex ™ SG-30 are products of Rohm and Haas Company (Philadelphia, PA, USA).
Drewplus ™ L-475 is a product of Ashland Specialty Chemical Company (Dublin, OH, USA).
Triton ™ X-405 is a product of Dow Chemical Company (Midland, MI, USA).

The formulated paint was obtained by adding thickener and water to 963.5 g of Pre-paint #1. To maintain constant solids of the fully formulated paint, the combined weight of added thickeners and water equals 49.5 g. The density of the fully formulated paint was 1013 pounds per 100 gallons (1.2 kilogram per liter). The pH of the fully formulated paints were in the range of 8.5 to 9.0.

Formulated paints were made by the following method. To 963.5 g Pre-paint #1, an amount of aqueous thickener dispersion and an amount of water were slowly added and stirred on a lab mixer for ten minutes. The total combined amount of aqueous thickener dispersions and water is 49.5 grams. In the following data presentation, thickener concentrations in the paint are described in terms of dry grams of thickener added even though the aqueous thickener composition was admixed into the paint. For example, a concentration of 3 dry grams of a thickener can be obtained in the paint by adding 15 grams of 20% solids thickener dispersion. Following a 24 hour equilibration at room temperature, the thickened paint was stirred for one minute on a lab mixer before measuring viscosity values.

"KU viscosity" is a measure of the mid-shear viscosity as measured by a Krebs viscometer. The Krebs viscometer is a rotating paddle viscometer that is compliant with ASTM-D562. KU viscosity was measured on a Brookfield Krebs Unit Viscometer KU-1+ available from Brookfield Engineering Labs (Middleboro, Mass., USA). "KU" shall mean Krebs unit.

"ICI viscosity" is the viscosity, expressed in units of poise, measured on a high shear rate, cone and plate viscometer known as an ICI viscometer. An ICI viscometer is described in ASTM D4287. It measures the viscosity of a paint at approximately 10,000 $seq^{-1}$. ICI viscosities of paints were measured on a viscometer manufactured by Research Equipment London, Ltd (London, UK). An equivalent ICI viscometer is the Elcometer 2205 manufactured by Elcometer, Incorporated (Rochester Hills, Mich., USA). The ICI viscosity of a paint typically correlates with the amount of drag force experienced during brush application of the paint.

Thickener performance in the formulated latex paints was comparable to that of commercially available thickeners (Table 4).

TABLE 4

Thickener Performance of Thickener Comparative C in White Paint

| Thickener | Concentration (g) | KU | ICI (poise) | Brookfield (#3, 6 rpm) |
|---|---|---|---|---|
| Acrysol SCT-275 | 1.93 | 101 | 1.0 | 8,200 |
| Comparative C | 1.75 | 106 | 0.8 | 52,500 |

Acrysol ™ SCT-275 is a product of Rohm and Haas Company (Philadelphia, PA, USA).

Thickener Performance Upon Color Tinting: Comparative Thickeners

The white paint formulated with Comparative C above was tinted by adding 35 g of red iron oxide colorant to 200 g of base paint followed by mixing on a paint shaker for 10 minutes. The red iron oxide colorant was obtained from the Sherwin Williams Company (Cleveland, Ohio, USA). KU, ICI, and Brookfield viscosities were measured one hour after tinting (Table 5). The viscosity measurement was preceded by one minute of stirring on a mechanical mixer.

TABLE 5

Thickener Performance Upon Color Tinting for Thickener Comparative C

| Thickener | Change in KU upon tinting | KU | ICI (poise) | Brookfield, cps (#3, 6 rpm) |
|---|---|---|---|---|
| Comparative C | −46 | 60 | 0.6 | 480 |

The red iron oxide tinted paint exhibited Stormer, ICI, and Brookfield viscosities of 60 KU, 0.6 poise and 480 cps, respectively. Thus, the addition of colorant depressed the Comparative C thickened paint's Stormer viscosity from 106 KU to 60 KU, a loss of 46 KU. Such a drastic drop in KU viscosity is common to all commercial HEUR thickeners and is highly problematic for paint formulators.

Example 1

Preparation of N,N-Bis(2-ethylhexyl)(oxiranylmethyl)amine

A mixture of epichlorohydrin (111 g, 1.2 mol), and water (0.27 g, 0.015 mol) was vigorously stirred at room temperature. Bis(2-ethylhexyl)amine (241.4 g, 1.0 mol) was added slowly by an addition funnel. The mixture was slowly heated to 70° C. and then stirred at 70° C. for 6 hours. The mixture was washed with aqueous potassium carbonate, $K_2CO_3$, (20%, 200 ml). Sodium hydroxide, NaOH, (36%, 200 ml) was added to the oil phase and the mixture was stirred at 70-90° C. for 18 hours. The phases were separated and extracted with ethyl acetate (3×100 ml). The combined extracts were washed with brine, dried over magnesium sulfate, $MgSO_4$, and the solvent removed by rotary evaporation.

Example 2

Polymer Comprising Blocks of Oligomeric Hydrophobes with Amine Groups

Polyethylene glycol, PEG, (200 g, 0.0143 mol, Mw 14,000) was heated to 110° C. in the reactor under vacuum (~20 mmHg) for 2 hours. After releasing vacuum, sodium hydroxide, NaOH, (8.00 g, 0.200 mol) was added and stirred for 1 hour at 110° C. to de-protonate the PEG. N,N-Bis(2-ethylhexyl)(oxiranylmethyl)amine (33.94 g, 0.114 mol) was charged to the vessel and the reaction mixture stirred for 5 hours at 110° C. After cooling to 60° C., toluene (~150 g) was added to dissolve the mixture. The polymer was precipitated out with hexane (~200 ml), filtered, and washed with hexane. Residual hexane was removed by evaporation at room temperature in a hood. Molecular weight was about 15,000.

Example 3

Polymer Comprising Blocks of Oligomeric Hydrophobes with Amine Groups

A mixture of PEG (200 g, molecular weight 8000) and toluene (325 g) is dried by azeotropic distillation. The mixture is cooled to 90° C., and HMDI (5 g) and 0.2 g dibutyltin dilaurate are added. After 1 hour at 90° C. with stirring, the mixture is cooled to 80° C. and sodium hydroxide (5 g) is added. After 1 hour, N,N-dihexyl(oxiranylmethyl)amine (12 g) is added and the reaction temperature raised to 120° C. After stirring at this temperature for 4 hours, the reaction mixture is cooled to 60° C. The polymer is isolated via precipitation from hexanes, filtered, and dried. Mw is expected to be about 30,000.

Aqueous Composition of Thickener Example 2

A 17.5 weight % aqueous solution of Example 2 was made by mixing 8.75 gms of the polymer isolated in Example 2 with 41.25 gms of water. After 24 hours of dissolution, the sample was thickly gelatinous or caulk-like and did not pour readily. Viscosity and pH could not be determined because the sample was a semi-solid. A second 17.5 weight % aqueous solution of Example 2 was made by mixing 8.75 gms of the polymer isolated in Example 2 with 1.5 gms of lactic acid (85% lactic acid, 15% water) and 39.75 gms of water. The aqueous composition Example 2 containing lactic acid exhibits a 25° C. viscosity of 60 cps (measured with spindle #3 at 60 rpm) with a pH value of 4.3. That is, the thickener of Example 2 is an acid suppressible thickener.

Thickener Performance in Paints for Thickener Example 2

The white paint was formulated with commercially available thickener, Acrysol RM-825 or Example 2 thickener. The Example 2 thickener was added as a solvent free, pourable aqueous composition at 17.5 weight % at pH=4.3 with lactic acid suppression. Thickener performance in the formulated latex paint is shown in Table 6.

TABLE 6

Thickener Performance of Thickener Example 2 in White Paint

| Thickener | Concentration (g) | KU | ICI (poise) | Brookfield, cps (#3, 6 rpm) |
|---|---|---|---|---|
| Acrysol ™ RM-825 | 2.5 | 119 | 0.85 | 4300 |
| Example 2 | 5.5 | 72 | 0.85 | 640 |

Acrysol ™ RM-825 is a product of Rohm and Haas Company (Philadelphia, PA, USA).

The thickener of Example 2 functions as an acid suppressible thickener as it is readily pourable at low pH, but functions well in thickening at higher pH.

Thickener Performance Upon Color Tinting for Thickener Example 2

The white paints formulated with either Acrysol RM-825 or Example 2 above were tinted by adding 23.5 g of Ben Moore Phthalo Blue (Color Preview) to 200 g of the two base paints described in Table 6. Thickener performance upon color tinting of the latex paint is shown in Table 7.

TABLE 7

Thickener Performance Upon Color Tinting for Thickener Example 2

| Thickener | Change in KU upon tinting | KU | ICI (poise) | Brookfield, cps (#3, 6 rpm) |
|---|---|---|---|---|
| Acrysol ™ RM-825 | −44 | 75 | 1.0 | 780 |
| Example 2 | +16 | 88 | 1.3 | 1660 |

The inventive thickener with blocks of Oligomeric hydrophobes comprising amine groups resists the drastic drop in KU viscosity upon color tinting and is more user friendly for the paint formulator.

The singular forms "a," "an," and "the" include plural referents unless the context clearly dictates otherwise. Unless defined otherwise, technical and scientific terms used herein have the same meaning as is commonly understood by one skilled in the art. The endpoints of all ranges directed to the same component or property are inclusive of the endpoint and independently combinable. As used herein, the term "(meth) acrylic" encompasses both acrylic and methacrylic. Similarly, the term "poly(meth)acrylamide" encompasses both polyacrylamide and polymethacrylamide.

As described earlier herein, the associative thickener of this invention preferably has a non-ionic water soluble backbone. The addition of minor amounts of ionic groups in the backbone of the inventive associative thickener is also contemplated. Minor amounts of ionic groups are less than 20 weight percent, and more preferably less than 5 weight percent, of ionic monomer units based on the total weight of backbone monomer units. Thus, the associative thickener of this invention may have a substantially non-ionic water soluble backbone and still be considered a non-ionic water soluble backbone.

All cited documents are incorporated herein by reference.

What is claimed is:

1. An aqueous associative thickener polymer composition comprising:
   (a) 1% to 60% by weight of an associative thickener having a backbone comprising a polyoxyalkylene, a polysaccharide, or a polyvinyl alcohol, said associative thickener further comprising blocks of oligomeric hydrophobes that are derived from monomers selected from the group consisting of i) alkyl or aryl moieties containing a polymerizable cyclic monomer or mixture thereof, ii) alkyl or aryl moieties containing polymerizable ethylenically unsaturated monomer or mixture thereof, iii) derivatives of i) or ii), and iv) mixtures of i), ii) or iii), wherein said blocks of oligomeric hydrophobes are attached to or within the polymer backbone and are composed of two or more units of the same or different hydrophobes and wherein one or more of said hydrophobes comprises a secondary amine, or a tertiary amine, or a tertiary phosphine, or a combination thereof, and optionally a quaternary amine, with the proviso that less than 80% of the total amine functionality is a quaternary amine;
   (b) sufficient acid to substantially protonate the secondary amine, or the tertiary amine, or the tertiary phosphine, or combination thereof;
   (c) 40% to 99% by weight of water; and
   (d) 0% to 15% by weight of an organic co-solvent, surfactant compound, or any combination thereof, as a viscosity-suppressing additive.

2. The composition of claim 1, wherein the associative thickener has a backbone comprising one or more polyoxyalkylene segments greater than 10 oxyalkylene units in length.

3. The composition of claim 1, wherein the associative thickener has a backbone comprising one or more polysaccharide segments greater than 10 saccharide units in length.

4. The composition of claim 2, wherein the backbone of the associative thickener further comprises one or more segments selected from (i) a urethane segment, (ii) a urea segment, (iii) an ester segment, (iv) an ether segment, (v) an acetal segment, (vi) a ketal segment, (vii) an aminoplast segment, (viii) a segment comprising the residue of the reaction of an epihalohydrin with an alcohol, an amine, or a mercaptan, and (ix) a segment comprising the residue of the reaction of a trihaloalkane with an alcohol, an amine, or a mercaptan, and (x) combinations of the foregoing.

5. The composition of claim 2, wherein the associative thickener is a hydrophobically modified polyurethane polyether comprising the reaction product of a N, N-dialkyl(oxiranylmethyl)amine with a multi-functional isocyanate, a polyether diol having a weight average molecular weight between 2,000 and 12,000, and optionally a polyether triol.

6. The composition of any of claims 1-5, wherein the amount of acid is sufficient to adjust the pH of the composition to a pH of 2.5 to 6.0.

7. An aqueous associative thickener polymer composition comprising:
   (a) 1% to 60% by weight of an associative thickener comprising a substantially non-ionic water soluble backbone and blocks of oligomeric hydrophobes attached to or within the polymer backbone wherein said oligomeric blocks are composed of two or more units of the same or different hydrophobes wherein one or more of said hydrophobes comprises a secondary amine, or a tertiary amine, or a tertiary phosphine, or a combination thereof, and optionally a quaternary amine, with the proviso that less than 80% of the total amine functionality is a quaternary amine;
   (b) sufficient acid to substantially protonate the secondary amine, or the tertiary amine, or the tertiary phosphine, or combination thereof;
   (c) 40% to 99% by weight of water; and
   (d) 0% to 15% by weight of an organic co-solvent, surfactant, cyclodextrin compound, or any combination thereof, as a viscosity-suppressing additive.

8. The aqueous associative thickener polymer composition of claim 7, wherein the substantially non-ionic water soluble backbone further comprises a polyoxyalkylene, or a poly (meth)acrylamide, or a polysaccharide, or a polyvinyl alcohol, or a copolymer comprising esters of (meth)acrylic acid.

9. The aqueous associative thickener polymer composition of claim 7, wherein the blocks of oligomeric hydrophobes are derived from monomers selected from the group consisting of i) alkyl or aryl moieties containing a polymerizable cyclic monomer or mixture thereof, ii) alkyl or aryl moieties containing a polymerizable ethylenically unsaturated monomer or mixture thereof, iii) derivatives of i) or ii), and iv) mixtures of i), ii) or iii).

10. A polymer composition, comprising in admixture,
   (a) an aqueous polymer system; and
   (b) an aqueous thickener composition comprising, based on the weight of the aqueous thickener composition:
      (i) 1% to 60% by weight of an associative thickener having a backbone comprising a polyoxyalkylene, polysaccharide, or a polyvinyl alcohol, said associative thickener further comprising blocks of oligomeric hydrophobes attached to or within the polymer backbone wherein said blocks of oligomeric hydrophobes are composed of two or more units of the same or different hydrophobes wherein one or more of said hydrophobes comprises a secondary amine, or a tertiary amine, or a tertiary phosphine, or a combination thereof, and optionally a quaternary amine, with the proviso that less than 80% of the total amine functionality is a quaternary amine;
(ii) 40% to 99% by weight of water; and
(iii) 0% to 15% by weight of an organic co-solvent, surfactant, cyclodextrin compound, or any combination thereof;
wherein the secondary amine, or the tertiary amine, or the tertiary phosphine, or combination thereof, are substantially unprotonated.

11. The polymer composition of claim 10 wherein the associative thickener of the aqueous thickener composition has a backbone comprising a polyoxyalkylene segment greater than 10 oxyalkylene units in length and one or more segments selected from (i) a urethane segment, (ii) a urea segment, (iii) an ester segment, (iv) an ether segment, (v) an acetal segment, (vi) a ketal segment, (vii) an aminoplast segment, (viii) a segment comprising the residue of the reaction of an epihalohydrin with an alcohol, an amine, or a mercaptan, and (ix) a segment comprising the residue of the reaction of a trihaloalkane with an alcohol, an amine, or a mercaptan, and (x) combinations of the foregoing, or wherein the associative thickener is a hydrophobically modified cellulosic polymer.

* * * * *